(12) United States Patent
Liang et al.

(10) Patent No.: US 8,901,836 B2
(45) Date of Patent: Dec. 2, 2014

(54) DIMMING CONTROLLING CIRCUIT FOR LED

(75) Inventors: Pengfei Liang, Shenzhen (CN); Wei Wu, Shenzhen (CN); Yun Yang, Shenzhen (CN)

(73) Assignees: Shenzhen BYD Auto R&D Company Limited, Shenzhen (CN); BYD Company Limited, Shenzhen (CN)

( * ) Notice: Subject to any disclaimer, the term of this patent is extended or adjusted under 35 U.S.C. 154(b) by 0 days.

(21) Appl. No.: 13/819,625

(22) PCT Filed: Aug. 31, 2011

(86) PCT No.: PCT/CN2011/079138
§ 371 (c)(1),
(2), (4) Date: Feb. 27, 2013

(87) PCT Pub. No.: WO2012/028091
PCT Pub. Date: Mar. 8, 2012

(65) Prior Publication Data
US 2013/0154493 A1    Jun. 20, 2013

(30) Foreign Application Priority Data
Aug. 31, 2010   (CN) .......................... 2010 1 0274894

(51) Int. Cl.
*H05B 37/02*    (2006.01)
*H05B 33/08*    (2006.01)

(52) U.S. Cl.
CPC ............ *H05B 37/02* (2013.01); *H05B 33/0851* (2013.01); *Y02B 20/346* (2013.01); *H05B 33/0815* (2013.01)
USPC ............ 315/201; 315/291; 315/294; 315/297

(58) Field of Classification Search
CPC .............................. H05B 37/00; H05B 37/02
USPC .......... 315/201, 291, 294, 297, 312; 341/144, 341/145
See application file for complete search history.

(56) References Cited

U.S. PATENT DOCUMENTS

2007/0217220 A1    9/2007   Kang et al.
2008/0316781 A1   12/2008   Liu
(Continued)

FOREIGN PATENT DOCUMENTS

CN    1393665 A    1/2003
CN   101039540 A   9/2007
(Continued)

OTHER PUBLICATIONS

International Search Report and English Translation of the Written Opinion dated Nov. 24, 2011 for International Patent Application No. PCT/CN2011/079138 filed Aug. 31, 2011.
First Office Action dated Jul. 10, 2013 for corresponding Chinese Application No. 201010274894.5 filed Aug. 31, 2010.

*Primary Examiner* — Tung X Le
*Assistant Examiner* — Jonathan Cooper
(74) *Attorney, Agent, or Firm* — David D. Brush; Westman, Champlin & Koehler, P.A.

(57) ABSTRACT

A dimming controlling circuit for LED includes: a switch configured to connect a main circuit and a power grid; a switch-on duration controlling circuit configured to output a switch-on duration controlling signals according to action times of the switch; a switch-off controlling circuit configured to output a switch-off controlling signal according to a comparison result of the voltages of the switch-on duration controlling signal and of a signal from a terminal of a switch transistor in the main circuit; a switch-on controlling circuit configured to generate a switch-on controlling signal after a first preset duration since receiving the switch-off controlling signal; and a logic unit configured to output a switch transistor controlling signal.

12 Claims, 5 Drawing Sheets

(56) References Cited

U.S. PATENT DOCUMENTS

| | | | |
|---|---|---|---|
| 2010/0148691 A1* | 6/2010 | Kuo et al. | 315/291 |
| 2010/0264836 A1* | 10/2010 | Godbole | 315/185 R |
| 2011/0109249 A1 | 5/2011 | Liu et al. | |
| 2011/0199012 A1* | 8/2011 | Lai | 315/219 |

FOREIGN PATENT DOCUMENTS

| | | |
|---|---|---|
| CN | 101754530 A | 6/2010 |
| CN | 101808444 A | 8/2010 |
| CN | 102052592 A | 5/2011 |
| KR | 20090056567 A | 6/2009 |

* cited by examiner

DIMMING CONTROLLING CIRCUIT FOR LED

CROSS-REFERENCE TO RELATED APPLICATION

This Application is a Section 371 National Stage Application of International Application No. PCT/CN2011/079138, filed Aug. 31, 2011, which is incorporated by reference in its entirety and published as WO 2012/028091 on Mar. 8, 2012, in English, which claims priority and benefits of Chinese Patent Application Serial No. 201010274894.5, filed with the State Intellectual Property Office of P. R. China on Aug. 31, 2010, the entire content of which is incorporated herein by reference.

FIELD

The present disclosure relates to a field of LED controlling circuit, and more particularly, to a dimming controlling circuit for LED.

BACKGROUND

LED lamp has gradually become a new generation of illuminations because of advantages such as low energy consumption, energy-saving, fast response and longer service life etc. However, dimming controlling for LED lamp is still a realistic problem.

The current dimming technology for LED lamp includes linear dimming, PMW (Pulse Width Modulation) dimming and silicon controlled dimming, all of which are realized by adding some circuits inside driving chips of the LED and adding peripheral components cooperating with the circuits. For example, the linear dimming may be realized by adjusting an adjustable resistances and the PMW dimming may be realized by adding some PMW chips, both of which need adding some extra components. Although the silicon controlled dimming may replace incandescent lamps or halogen lamps by LED lamps, it works under a chopped wave mode and an output voltage may not be a sine wave and thus a lot of harmonic waves may be created and may cause serious damages to a power grid.

Since the above-mentioned methods of dimming need adding extra components outside chips, structures of the lamps may be complicated, manufacture costs may be high, and operations of the lamps may be inconvenient.

SUMMARY

The present disclosure is directed to solve at least one of the problems. Accordingly, a dimming controlling circuit for LED is provided to control on or off of a switch transistor in a main circuit and to supply stable electrical current for LED lamp.

According to an embodiment of the present disclosure, a dimming controlling circuit for LED is provided, comprising: a switch configured to connect a main circuit and a power grid; a switch-on duration controlling circuit configured to output a switch-on duration controlling signal according to action times of the switch; a switch-off controlling circuit configured to compare a voltage of the switch-on duration controlling signal and a voltage of a signal from a terminal of a switch transistor in the main circuit to obtain a comparison result and to output a switch-off controlling signal according to the comparison result; a switch-on controlling circuit configured to generate a switch-on controlling signal after a first preset duration since receiving the switch-off controlling signal; and a logic unit configured to output a switch transistor controlling signal according to the switch-off controlling signal and the switch-on controlling signal.

The dimming controlling circuit for LED according to embodiments of the present disclosure may realize a graded dimming of the LED by fast actions of the switch, and the circuit provided by the present disclosure is simple in structure and a manufacturing cost is low.

BRIEF DESCRIPTION OF THE DRAWINGS

The foregoing and other features and advantages of the disclosure will become apparent and more readily appreciated from the following descriptions taken in conjunction with the drawings in which.

DETAILED DESCRIPTION

Figure 1:
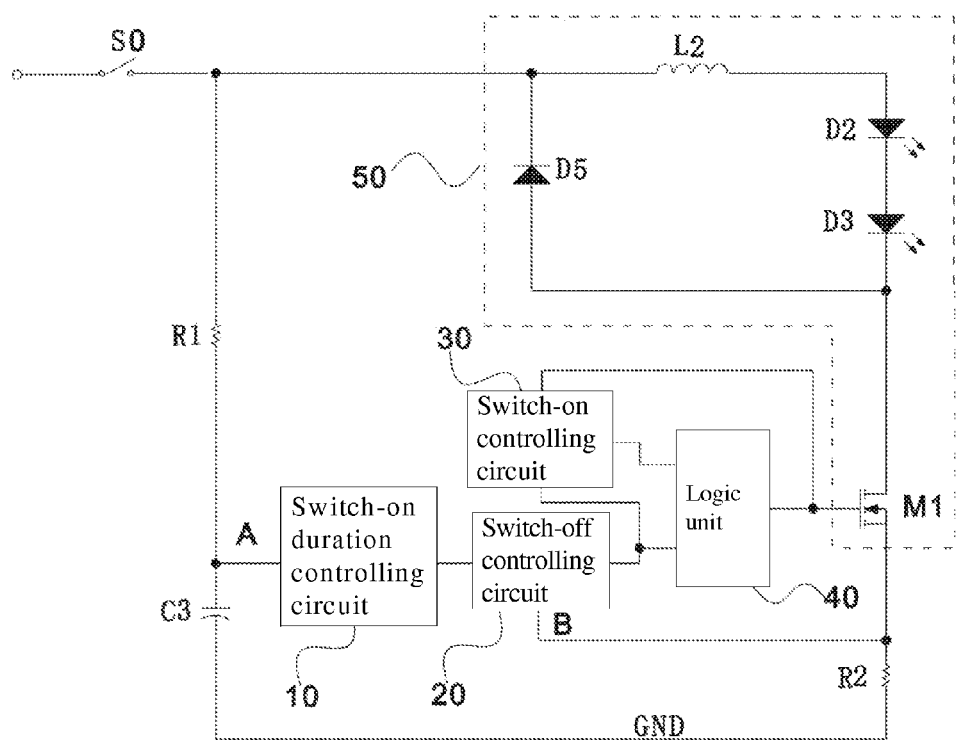
FIG. 1 is a schematic diagram of a dimming controlling circuit for LED according to a first embodiment of the present disclosure.

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

An embodiment of the dimming controlling circuit for LED according to the present disclosure will be described with reference to FIG. 1 and FIG. 2. FIG. 1 is a schematic diagram of a dimming controlling circuit for LED according to a first embodiment of the present disclosure. As shown in FIG. 1, the dimming controlling circuit for LED comprises: a switch S0, a switch-on duration controlling circuit 10, a switch-off controlling circuit 20, a switch-on controlling circuit 30 and a logic unit 40.

The switch S0 is configured to connect a main circuit 50 and a power grid (not shown in Figs). The switch-on duration controlling circuit 10 is configured to output a switch-on duration controlling signal according to action times of the switch S0. The switch-off controlling circuit 20 is configured to compare a voltage of the switch-on duration controlling signal and a voltage of a signal from a terminal of a switch transistor M1 in the main circuit 50 to obtain a comparison result and to output a switch-off controlling signal according to the comparison result. The switch-on controlling circuit 30 is configured to generate a switch-on controlling signal after a first preset duration T1 since receiving the switch-off controlling signal. The logic unit 40 is configured to output a switch transistor controlling signal according to the switch-off controlling signal and the switch-on controlling signal so as to control the switch transistor M1.

The dimming controlling circuit for LED according to the embodiment of the present disclosure may realize a graded dimming of the LED by fast actions of the switch, and the circuit provided by the present disclosure is simple in structure and a manufacturing cost is low.

Furthermore, a first terminal of a first resistance R1 is connected with a first terminal of a third capacitance C3; a second terminal of the first resistance R1 is connected with the switch S0; and a second terminal of the third capacitance C3 is grounded. A node A between the first resistance R1 and the third capacitance C3 shown in FIG. 1 is connected with the switch-on duration controlling circuit 10 to provide an input voltage for the switch-on duration controlling circuit 10. The main circuit 50 is connected to ground via a second resistance R2, and a node B between the second resistance R2 and the main circuit 50 shown in FIG. 1 may lead the signal from the terminal of the switch transistor M1 in the main circuit 50 to the switch-off controlling circuit 20.

Figure 2:
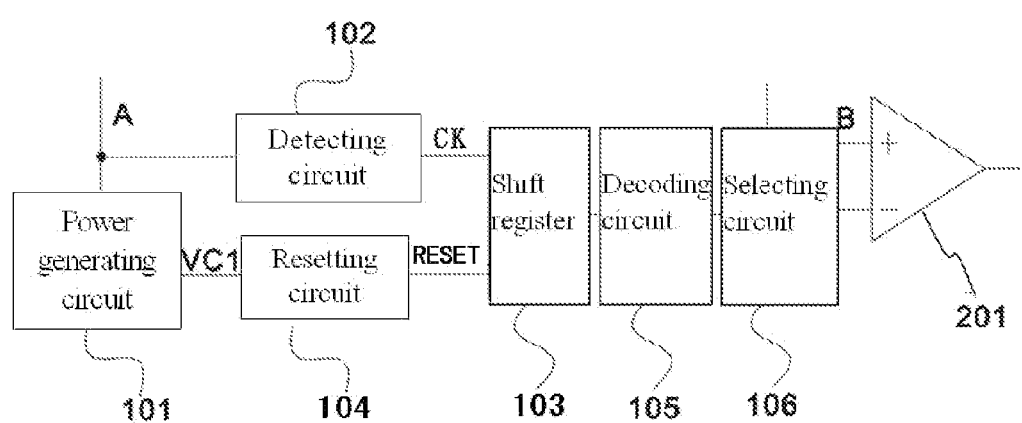
FIG. 2 is a schematic diagram of a switch-on duration controlling circuit and a switch-off controlling circuit according to the first embodiment of the present disclosure shown in FIG. 1.

FIG. 2 is a schematic diagram of a switch-on duration controlling circuit and a switch-off controlling circuit according to the first embodiment of the present disclosure shown in FIG. 1. As shown in FIG. 2, the switch-on duration controlling circuit 10 comprises: a power generating circuit 101, a detecting circuit 102, a shift register 103, a resetting circuit 104 and a decoding circuit 105. The power generating circuit 101 is configured to generate a first voltage according to the input voltage. The detecting circuit 102 is configured to detect the input voltage, to output an invalid shift controlling signal when determining the input voltage reaches a first threshold voltage and to output a valid shift controlling signal when determining the input voltage descends below a second threshold voltage and above a third threshold voltage. The shift register 103 is configured to output a shift result according to the shift controlling signal. The resetting circuit 104 is configured to reset the shift register 103 to zero, such as by providing a power to the shift register 103. The decoding circuit 105 is configured to decode according to the shift result outputted by the shift register 103 to obtain a decoding result. The selecting circuit 106 configured to select a voltage corresponding to the switch-on duration controlling signal according to the decoding result of the decoding circuit 105. The first threshold voltage is higher than the second threshold voltage and the second voltage is higher than the third threshold voltage.

The switch-off controlling circuit 20 comprises a comparator 201. A first input terminal of the comparator 201 is connected with the voltage of the signal from the terminal of the switch transistor M1 in the main circuit 50 and a second input terminal of the comparator 201 is connected with the voltage selected by the selecting circuit 106. The first input terminal of the comparator 201 is a positive input terminal and the second input terminal of the comparator is a negative input terminal.

As shown in FIG. 1, the main circuit 50 comprises a second inductor L2, a LED group (D2 and D3), a switch transistor M1 and a flywheel diode D5. The second inductor L2, the LED group and the flywheel diode D5 are connected in series to form a loop, a negative terminal of the flywheel diode D5 is connected with the power grid and a positive terminal of the flywheel diode D5 is connected with a drain of the switch transistor M1. In one embodiment, the switch transistor M1 is a NMOS transistor.

In one embodiment, the logic unit 40 may be a R-S trigger, a R terminal of the R-S trigger is configured to receive the output switch-off controlling signal sent by the switch-off controlling circuit 20, a S terminal of the R-S trigger is configured to receive the switch-on controlling signal sent by the switch-on controlling circuit 30, and an output terminal of the R-S trigger is connected with an input of the driving circuit 70 and outputs the switch transistor M1 controlling signal.

Another embodiment of the dimming controlling circuit for LED according to the present disclosure will be described with reference to FIG. 3 and FIG. 4.

Figure 3:
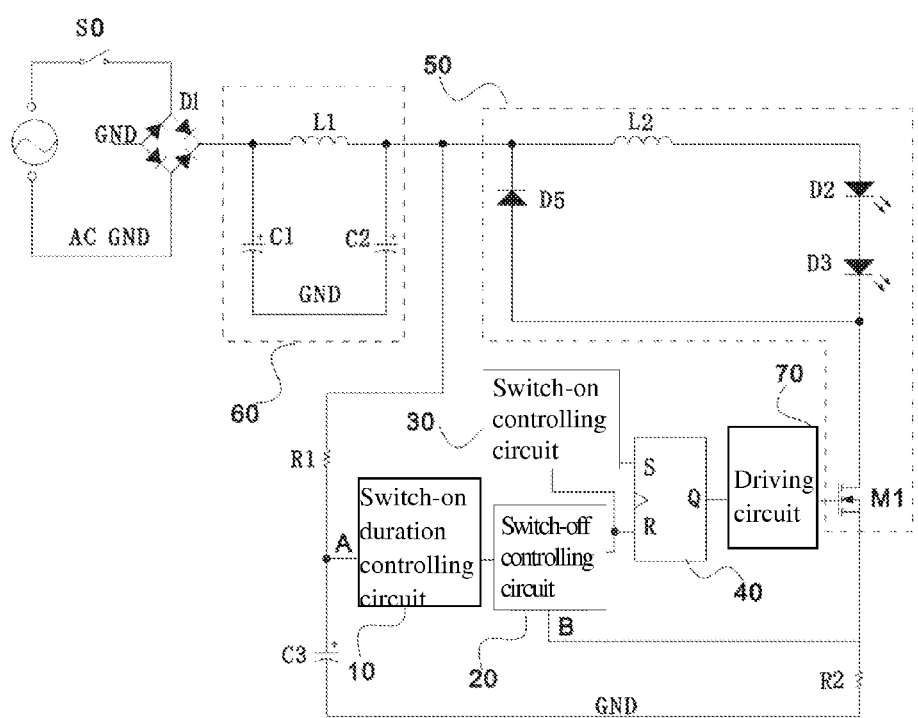
FIG. 3 is a schematic diagram of a dimming controlling circuit for LED according to a second embodiment of the present disclosure.

FIG. 3 is a schematic diagram of a dimming controlling circuit for LED according to a second embodiment of the present disclosure. As shown in FIG. 3, the difference between the first embodiment and the second embodiment is that the dimming controlling circuit for LED further comprises a rectifying circuit D1, a driving circuit 70 and a filtering circuit 60. The rectifying circuit D1 is connected with the main circuit 50. The rectifying circuit D1 may be a rectifying bridge formed by four diodes in one embodiment of the present disclosure. The driving circuit 70 is set at a controlling terminal of the switch transistor M1 to drive the switch transistor M1. The filtering circuit 60 is arranged between the main circuit 50 and the rectifying circuit D1. The filtering circuit 60 comprises a first inductor L1, a first capacitor C1 and a second capacitor C2. The first capacitor C1 and the second capacitor C2 are connected with each other in series, the first inductor L1 is connected with the capacitor C1 and the second capacitor C2 in parallel, and two terminals of the first inductor L1 are connected with the rectifying circuit D1 and the main circuit 50 respectively.

The logic unit 40 comprises a R-S trigger, a R terminal of the R-S trigger is configured to receive the output switch-off controlling signal sent by the switch-off controlling circuit 20, a S terminal of the R-S trigger is configured to receive the switch-on controlling signal sent by the switch-on controlling circuit 30, and an output terminal of the R-S trigger is connected with an input of the driving circuit 70 and outputs the switch transistor M1 controlling signal.

Figure 4:
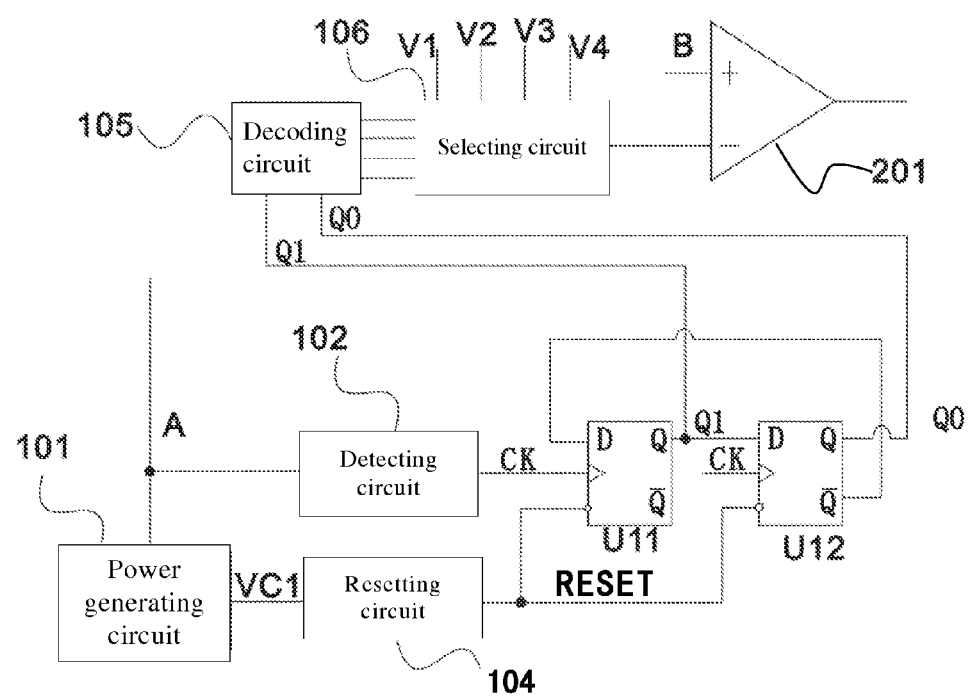
FIG. 4 is a schematic diagram of a switch-on duration controlling circuit and a switch-off controlling circuit according to the second embodiment of the present disclosure shown in FIG. 3.

FIG. 4 is a schematic diagram of a switch-on duration controlling circuit and a switch-off controlling circuit according to the second embodiment of the present disclosure shown in FIG. 3. As shown in FIG. 4, the difference between the first embodiment and the second embodiment is that there are two shift registers U11 and U12, output terminals of the U11 and U12 are connected with an input terminal of the decoding circuit 105, and four decoding signals output by the decoding circuit 105 are connected with an input terminal of the selecting circuit 106 to select voltages corresponding to four switch-on duration controlling signals.

Next, a working principle of the dimming controlling circuit for LED in the second embodiment will be described in detail with reference to FIG. 3 to FIG. 5. In this embodiment, there are four dimming grades, and the LED group comprises two LED lamps.

Figure 5:
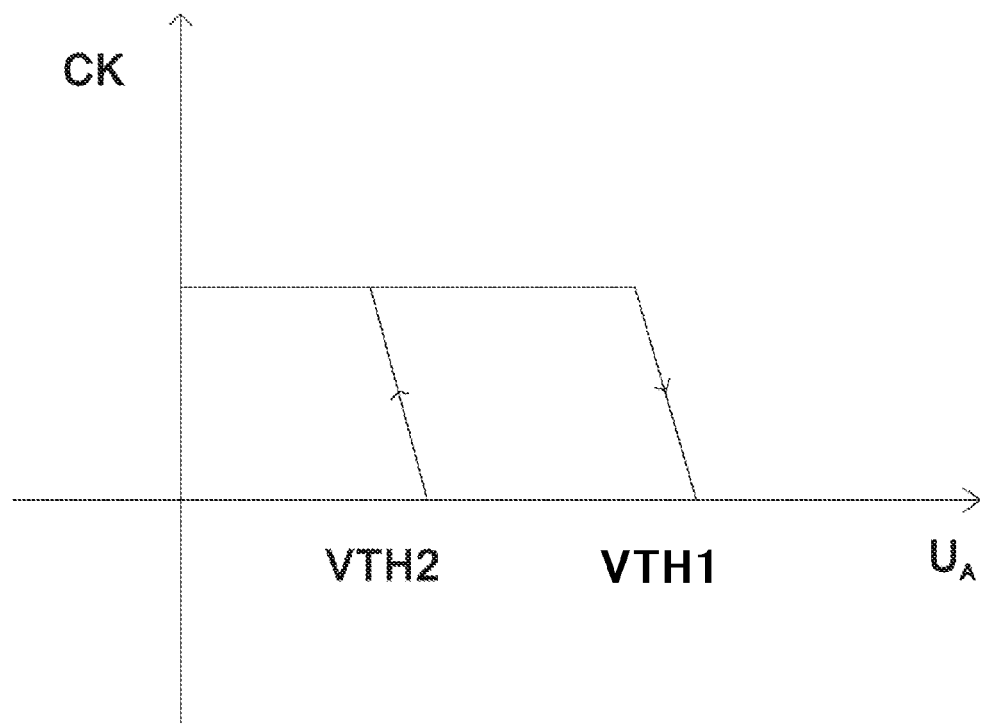
FIG. 5 is an input and output waveform diagram of a detecting circuit according to the second embodiment of the present disclosure shown in FIG. 3.

FIG. 5 is an input and output waveform diagram of the detecting circuit according to the second embodiment of the present disclosure.

Three voltages are preset for node A, which are VTH1, VTH2 and VTH3 (VTH3 is not shown in FIG. 5) and VTH3<VTH2<VTH1. When the switch S0 is ON, the voltage of node A begins to rise. When the voltage of node A is smaller than VTH3, the power generating circuit 101 doesn't generate a voltage. When the voltage of node A reaches VTH3, the power generating circuit 101 generates a voltage VC1. The voltage of the power grid continues to rise and reach VTH1 and the NMOS transistor M1 is still OFF, the switch-on controlling circuit 30 starts timing and when the time gets to a first preset time T1, the switch-on controlling circuit 30 outputs a switch-on controlling signal to conduct the NMOS transistor M1. If the switch-on controlling signal is high level 1, the output voltage of the R-S trigger is also high level 1 since the switch-on controlling signal is input to the S terminal of the R-S trigger 10, meanwhile the NMOS transistor M1 is conducted and a current through the second resistance R2 increases.

Meanwhile, the voltage VC1 makes the resetting circuit 103 output a resetting signal to reset the shift register 104. Both the outputs of the two shift registers U11 and U12 (Q1 and Q0) are reset to be zero. After the decoding circuit 105 processes the outputs of U11 and U12, the selecting circuit 106 selects a voltage corresponding to the switch-on controlling signal, and the voltage is defined as a first grade voltage V1, provided that V1 is 0.25V, meanwhile the voltage of the signal from the terminal of the switch transistor M1 in the main circuit 50 is the voltage of node B shown in FIG. 3.

The voltage of node B begins to rise when the NMOS transistor M1 is conducted, and when the voltage of node B is larger than the first grade voltage 0.25V, the output voltage of the comparator 201 is high level 1 and the output voltage of the R-S trigger 40 is low level 0 after the output voltage of the comparator 201 getting through the R terminal of the R-S trigger, and then the low level 0 output by the R-S trigger 40 makes the NMOS transistor M1 OFF. Because of the inductor L2, a current flows continuously in a free-wheeling loop formed by the inductor L2, the LED lamp group D2, D3 and the flywheel diode D5, and thus a stable current may be provided to the LED lamp group and then the LED lamp group is on a first grade brightness. When the NMOS transistor M1 is OFF, the switch-on controlling circuit 30 starts timing and outputs a switch-on controlling signal to conduct M1 when the timing reaches the first preset time T1. If there is no voltage change of the power grid, the detecting circuit 102 does not work and the LED lamp group may work under a stable current.

If the switch-off time of the switch S0 is longer than a second preset time T2, the voltage of node A descends to below the third threshold voltage VTH3 and the switch S0 is considered to be OFF. When the switch S0 is ON again, the shift register is reset to zero again and the working process is the same as the above-mentioned process and such process will not be described.

If the switch-off time of the switch S0 is shorter than the second preset time T2 and if the voltage of node A descends to be between VTH2 and VTH3, the power generating circuit 101 still outputs the voltage VC1. As shown in FIG. 5, when the voltage of node A descends to VTH2, the output CK of the detecting circuit 102 turns from the low level 0 to the high level 1. The shift register 104 is shifted because a waveform of the detecting circuit is during its ascending phase, i.e. the output of Q1 is 1, the output of the Q0 is 0. After the outputs of Q1 and Q0 is decoded by the decoding circuit 105, the selecting circuit 106 selects a second grade voltage V2 corresponding to the switch-on duration controlling signal, provided V2 is 0.175 v.

If the switch-off time of the switch S0 is short, the switch S0 is ON within the preset time T2. Since a period between the OFF and ON of the switch S0 is short, the lowest voltage of node A is still higher than VTH3, which makes the power generating circuit 101 continuously generate the voltage VC1 and the resetting circuit 103 is invalid because the resetting circuit 103 may not work without a power supply. When the switch S0 is ON, the voltage of the power grid begins to rise again. As shown in FIG. 5, when the voltage of node A reaches VTH1, the output CK of the detecting circuit 102 switches from high level 1 to low level 0, the shift register 104 keeps its previous output signal and does not shift, and then the selecting circuit 106 selects the second grade voltage V2. Furthermore, the switch-on controlling circuit 30 starts timing as soon as it receives a switch-off controlling signal, and when the time reaches the preset time T1, the NMOS transistor M1 is conducted and the current of the second resistance R2 increases gradually. When the voltage of node B is larger than V2 which is 0.175 v, the output of the comparator 201 is high level 1 and the output voltage of the R-S trigger 40 is low level 0 after the output voltage of the comparator 201 getting through the R terminal of the R-S trigger 40, and then the low level 0 output by the R-S trigger 40 makes the NMOS transistor M1 OFF. Because of the inductor L2, a current flows continuously in a free-wheeling loop formed by the inductor L2, the LED lamp group D2, D3 and the flywheel diode D5, and thus a stable current may be provided to the LED lamp group and then the LED lamp group is on a second grade brightness.

The working principle of the switch S0 hereafter is the same as the above. If the switch-off time of the switch S0 is longer than the second preset time T2, the switch S0 is considered to be OFF, and when S0 is ON again, the working process is the same as the first time. If the switch-off time of the switch S0 is shorter than the second preset time T2, when the switch S0 is OFF, the shift register 104 is shifted to the next grade; when the switch S0 is ON again, the shift register 104 does not shift and the LED lamp lights according to the brightness grade selected by the selecting circuit 106 when the switch S0 is OFF. If every switch-off time of the switch S0 is shorter than the second preset time T2, then before the switch-off time is longer than the second preset time T2, the brightness grade of the LED lamp group is adjusted each time when the switch S0 is ON or OFF.

In one embodiment of the present disclosure, the number of the shift register 104 is two, the number of selecting signals outputted by the decoding circuit 105 is four, the number of voltage grades of the selecting circuit 106 is four, and the number of brightness grades of the LED lamp group is also four. It should be understood that the number of shift registers may be changed, the number of brightness grades of the LED lamp group may be accordingly determined by users and designers and the number of the LED lamps may also be plural in some embodiments of the present disclosure. It should also be understood that the more the shift registers are, the more the voltage grades of the selecting circuit 106 are and the more the brightness grades of the LED lamp group are. For example, if the number of shift registers is three, then the number of selecting signals outputted by the decoding circuit 105 is eight, the number of voltage grades of the selecting circuit 106 is eight, and the number of brightness grades of the LED light group is also eight Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:
1. A dimming controlling circuit for LED, comprising:
a switch configured to connect a main circuit and a power grid;
a switch-on duration controlling circuit configured to output a switch-on duration controlling signal according to action times of the switch;
a switch-off controlling circuit configured to compare a voltage of the switch-on duration controlling signal and a voltage of a signal from a terminal of a switch transis- tor in the main circuit to obtain a comparison result and to output a switch-off controlling signal according to the comparison result;

a switch-on controlling circuit configured to generate a switch-on controlling signal after a first preset duration since receiving the switch-off controlling signal; and a logic unit configured to output a switch transistor controlling signal according to the switch-off controlling signal and the switch-on controlling signal, wherein the switch-on duration controlling circuit comprises:

a power generating circuit configured to generate a first voltage according to an input voltage;

a detecting circuit configured to detect the input voltage, to output an invalid shift controlling signal when determining the input voltage reaches a first threshold voltage and to output a valid shift controlling signal when determining the input voltage descends below a second threshold voltage and above the third threshold voltage;

a shift register configured to output a shift result according to the invalid or valid shift controlling signal;

a resetting circuit configured to reset the shift register to zero;

a decoding circuit configured to decode according to the shift result to obtain a decoding result; and a selecting circuit configured to select a voltage corresponding to the switch-on duration controlling signal according to the decoding result.

2. The dimming controlling circuit for LED according to claim 1, wherein the first threshold voltage is higher than the second threshold voltage and the second threshold voltage is higher than the third threshold voltage.

3. The dimming controlling circuit for LED according to claim 1, wherein the switch-off controlling circuit comprises:

a comparator, wherein a first input terminal of the comparator is connected with the voltage of the signal from the terminal of the switch transistor in the main circuit and a second input terminal of the comparator is connected with the voltage selected by the selecting circuit.

4. The dimming controlling circuit for LED according to claim 3, wherein the first input terminal of the comparator is a positive input terminal and the second input terminal of the comparator is a negative input terminal.

5. The dimming controlling circuit for LED according to claim 1, wherein the logic unit comprises a R-S trigger, a R terminal of the R-S trigger is configured to receive the output switch-off controlling signal sent by the switch-off controlling circuit, a S terminal of the R-S trigger is configured to receive the switch-on controlling signal sent by the switch-on controlling circuit and an output terminal of the R-S trigger is configured to output the switch transistor controlling signal.

6. The dimming controlling circuit for LED according to claim 1, wherein the main circuit comprises a second inductor, a LED group, a flywheel diode and a switch transistor, in which the second inductor, the LED group and the flywheel diode are connected in series to form a loop and the flywheel diode has a negative terminal connected with the power grid and a positive terminal connected with the switch transistor.

7. The dimming controlling circuit for LED according to claim 6, wherein the switch transistor is a NMOS transistor.

8. The dimming controlling circuit for LED according to claim 6, further comprising a driving circuit, which is set at a controlling terminal of the switch transistor to drive the switch transistor.

9. The dimming controlling circuit for LED according to claim 1, wherein the main circuit is also connected with a rectifying circuit.

10. The dimming controlling circuit for LED according to claim 9, wherein the rectifying circuit is a rectifying bridge formed by four diodes.

11. The dimming controlling circuit for LED according to claim 9, further comprising a filtering circuit arranged between the main circuit and the rectifying circuit.

12. The dimming controlling circuit for LED according to claim 11, wherein the filtering circuit comprises a first inductor, a first capacitor and a second capacitor, in which the first capacitor and the second capacitor are connected in series, the first inductor is connected with the first capacitor and the second capacitor in parallel, and two terminals of the first inductor are connected with the rectifying circuit and the main circuit respectively.

* * * * *

UNITED STATES PATENT AND TRADEMARK OFFICE
CERTIFICATE OF CORRECTION

Page 1 of 1

PATENT NO. : 8,901,836 B2
APPLICATION NO. : 13/819625
DATED : December 2, 2014
INVENTOR(S) : Liang et al.

It is certified that error appears in the above-identified patent and that said Letters Patent is hereby corrected as shown below:

Title Page

(30) Foreign Application Priority Data

Delete "2010 1 0274894" and insert --2010 1 0274894.5--.

Signed and Sealed this
Twenty-third Day of June, 2015

Michelle K. Lee
*Director of the United States Patent and Trademark Office*